(No Model.)  6 Sheets—Sheet 1.

H. WRIGHT.
CIRCULAR SAW MILL.

No. 332,691. Patented Dec. 15, 1885.

WITNESSES:
Fred. L. Dieterich
W. O. ...

INVENTOR.
Hugh Wright
By Johnston, Rundle
& Dye
ATTORNEYS.

N. PETERS. Photo-Lithographer. Washington, D. C.

(No Model.)

6 Sheets—Sheet 4.

H. WRIGHT.
CIRCULAR SAW MILL.

No. 332,691. Patented Dec. 15, 1885.

WITNESSES:
Fred. G. Dieterich,
Wm. E. Dyra.

INVENTOR.
Hugh Wright
By Johnston, Reinohl & Dyra
ATTORNEYS.

(No Model.) 6 Sheets—Sheet 5.

H. WRIGHT.
CIRCULAR SAW MILL.

No. 332,691. Patented Dec. 15, 1885.

WITNESSES:
Fred. G. Dieterich
Wm. E. Dyer

INVENTOR.
Hugh Wright
By Johnston, Reinohl & Dyer
ATTORNEYS.

(No Model.)

H. WRIGHT.
CIRCULAR SAW MILL.

No. 332,691.  Patented Dec. 15, 1885.

6 Sheets—Sheet 6.

WITNESSES:
Fred. G. Dieterich,
Wm. E. Dyrr.

INVENTOR.
Hugh Wright
By Johnston, Reinohl & Dyrr
ATTORNEYS.

United States Patent Office.

HUGH WRIGHT, OF NEW LISBON, OHIO.

CIRCULAR-SAW MILL.

SPECIFICATION forming part of Letters Patent No. 332,691, dated December 15, 1885.

Application filed June 17, 1885. Serial No. 168,919. (No model.)

*To all whom it may concern:*

Be it known that I, HUGH WRIGHT, a citizen of the United States, residing at New Lisbon, in the county of Columbiana and State of Ohio, have invented certain new and useful Improvements in Portable Saw-Mills; and I do hereby declare the following to be a full, clear, and exact description of the invention, such as will enable others skilled in the art to which it appertains to make and use the same.

In an ordinary portable saw-mill the operating-gear for feeding the timber to the saw is exposed to rain and snow in wet and cold weather, is liable to become clogged with snow and ice in freezing weather, and is subjected to accident by pieces of timber falling into said gear, which is also liable to trip the operator while passing over or among it.

My invention has for its object the covering and inclosing of the said gear for protecting it and for preventing accidents common to it.

My invention has also for its object the construction of a light, strong, durable, and efficient portable saw-mill with economy of material and in cost of construction.

My invention consists in the peculiar construction, combination, and arrangement of the several parts which enter into the construction of the improvement of the new and portable saw-mill, which will be hereinafter fully described.

Figure 1:
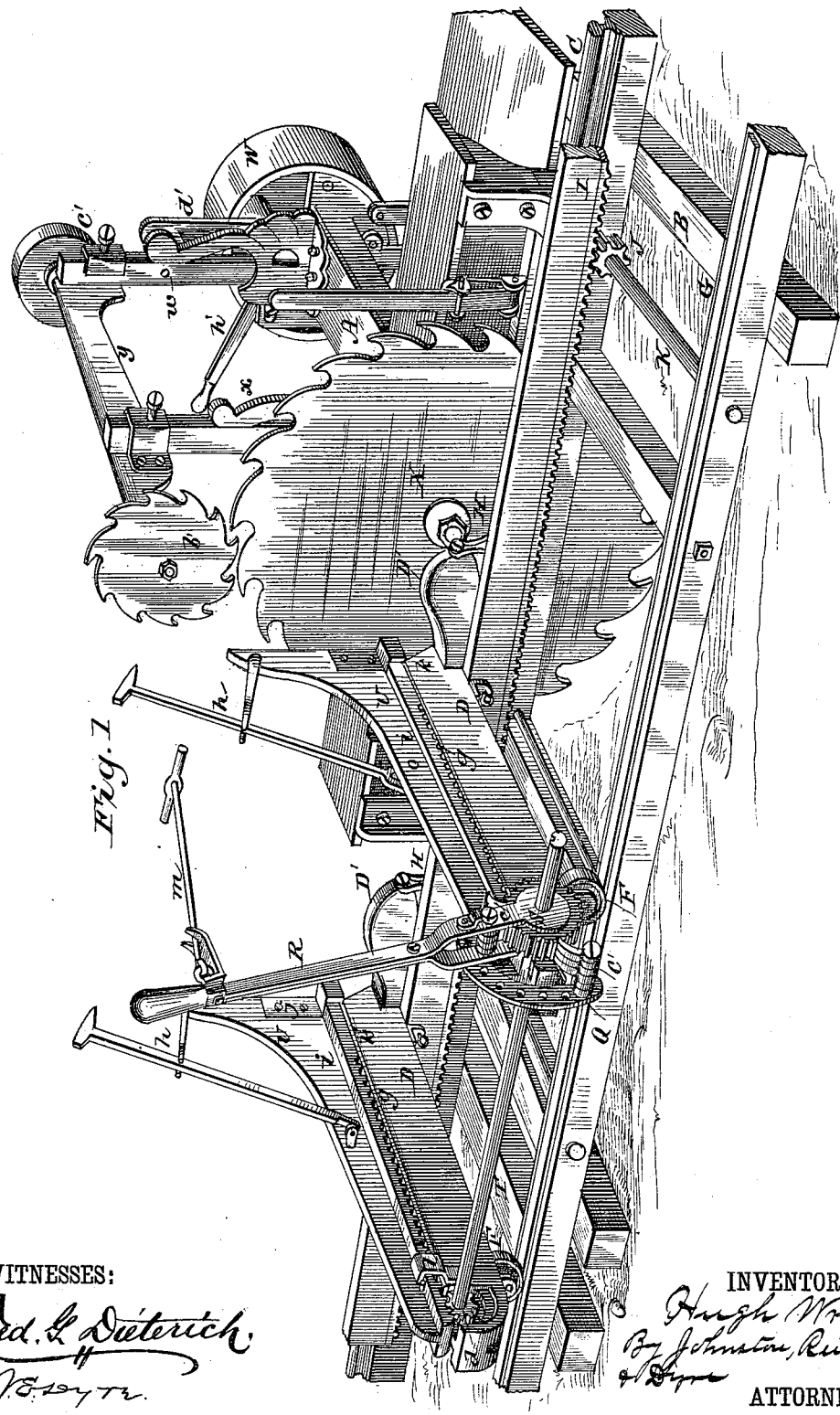
Figure 2:
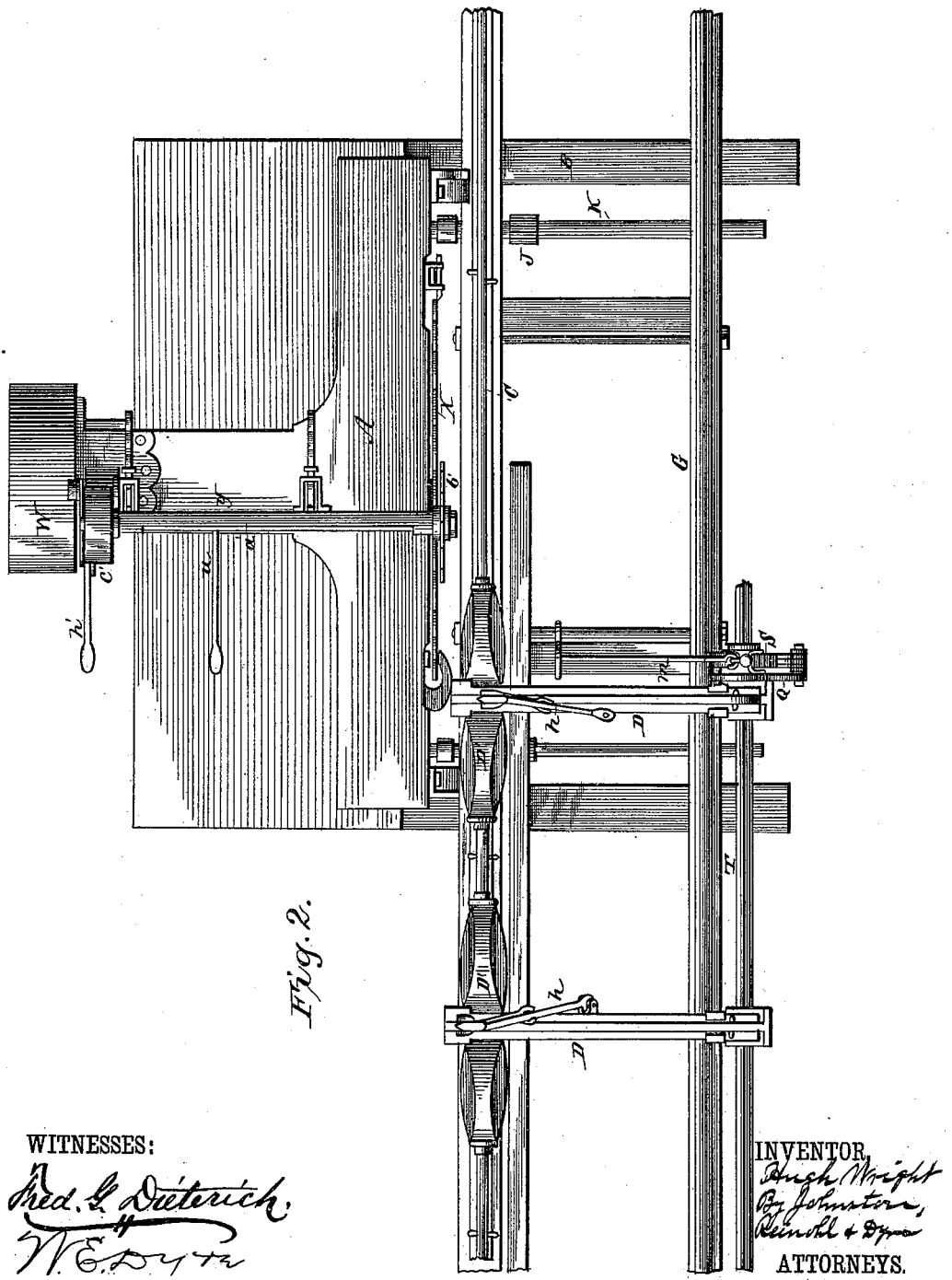
Figure 3:
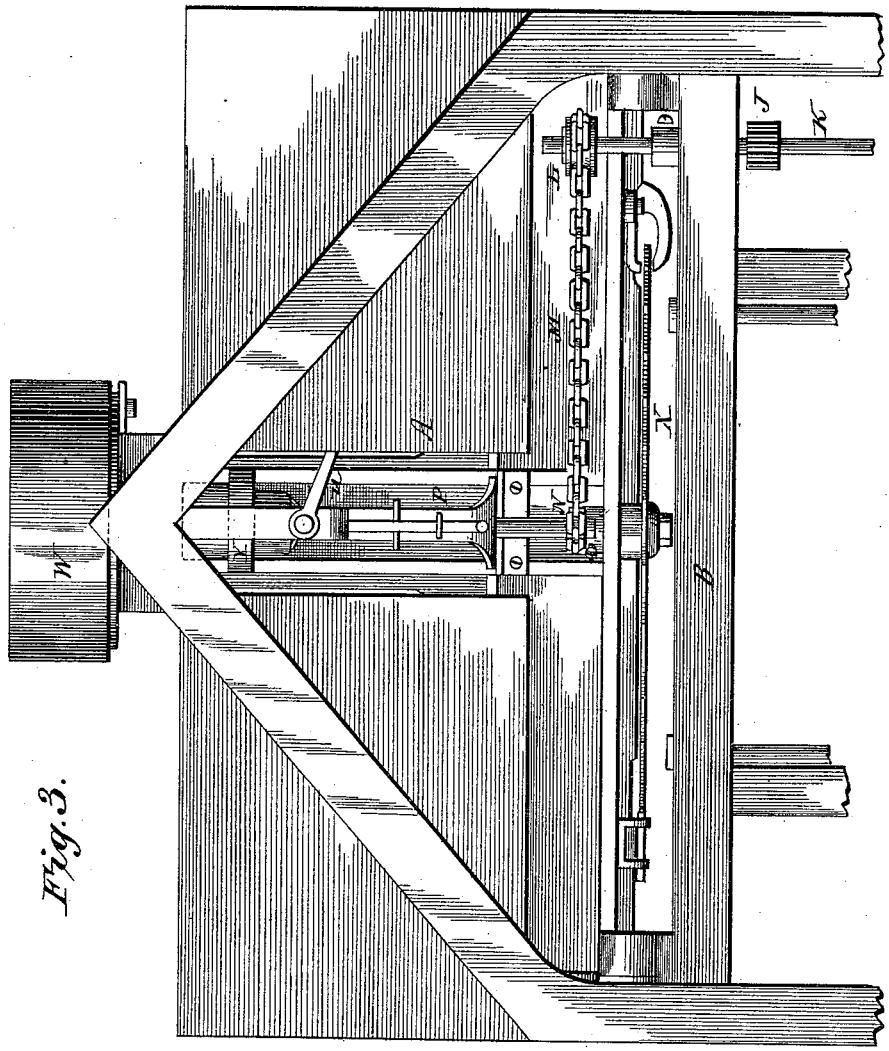
Figure 4:
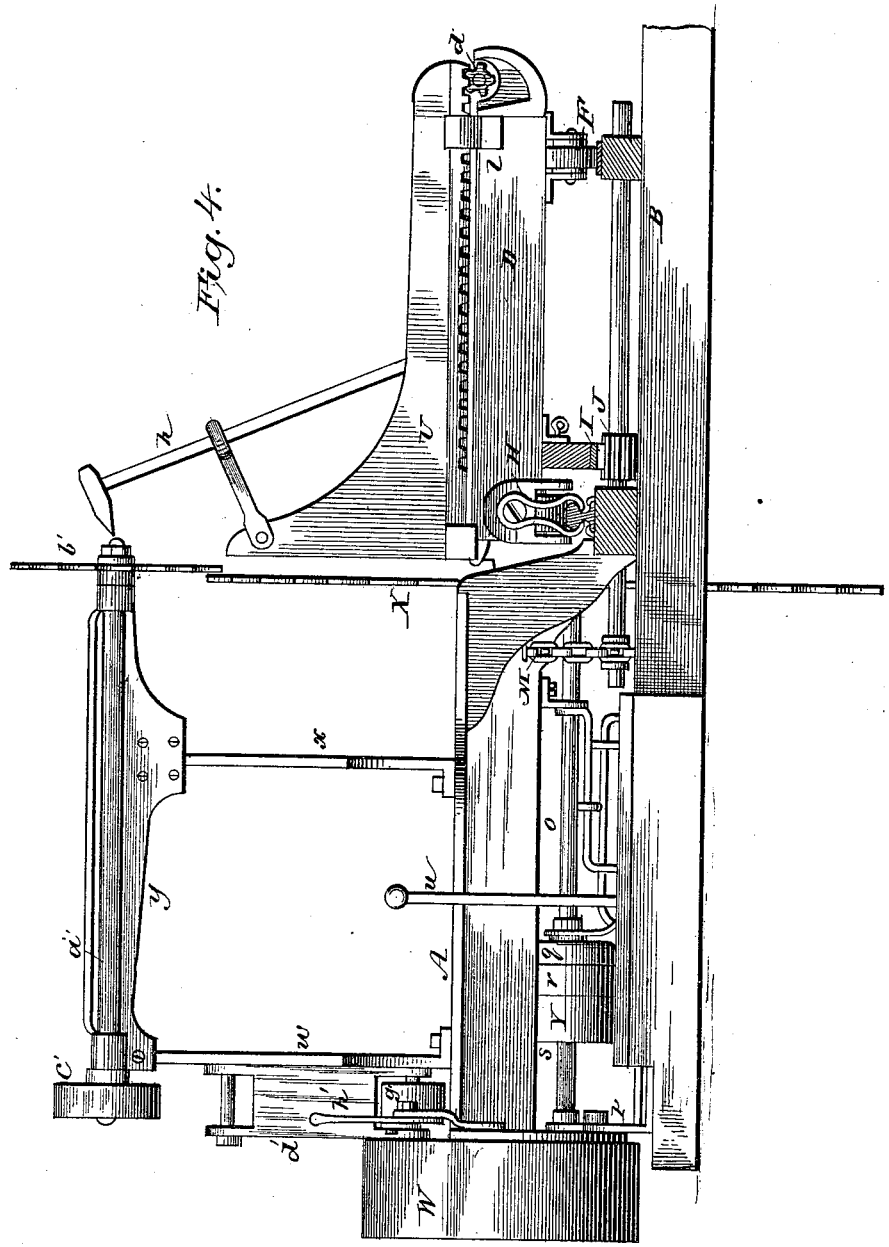
Figure 5:
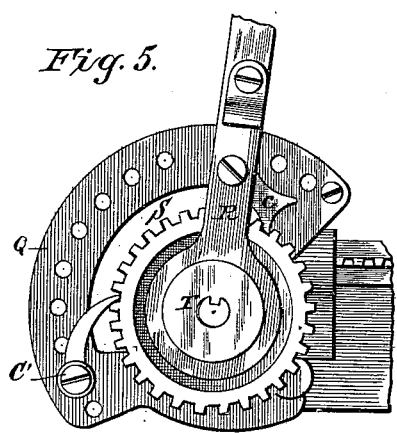

In the accompanying drawings, which form part of this specification, Figure 1 is a perspective view of my improvement in portable saw-mills. Fig. 2 is a top view or plan of the same. Fig. 3 is an inverted view of the saw-frame. Fig. 4 is an end elevation of said mill. Figs. 5, 6, 7, 8, 9, 10, 11, and 12 are detail views.

Reference being had to the accompanying drawings, A represents the frame of the saw, which frame is constructed of cast-iron, and its form is clearly indicated in Figs. 2, 3, 7, and 8, and is of such form and construction that it covers and incloses the driving mechanism employed for the "feed" of the mill. By this form and construction of the frame A the said driving mechanism and the main shaft for the saw is covered, inclosed, and protected from rain, snow, sawdust, falling pieces of timber, and all liability of accident or tripping of the operator.

Figure 6:
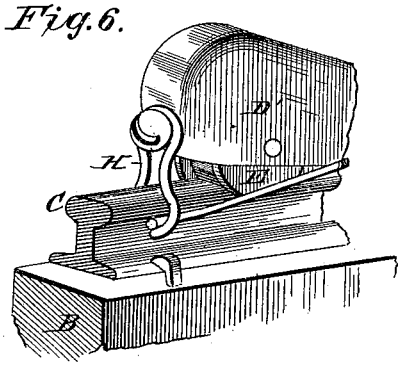
Figure 7:
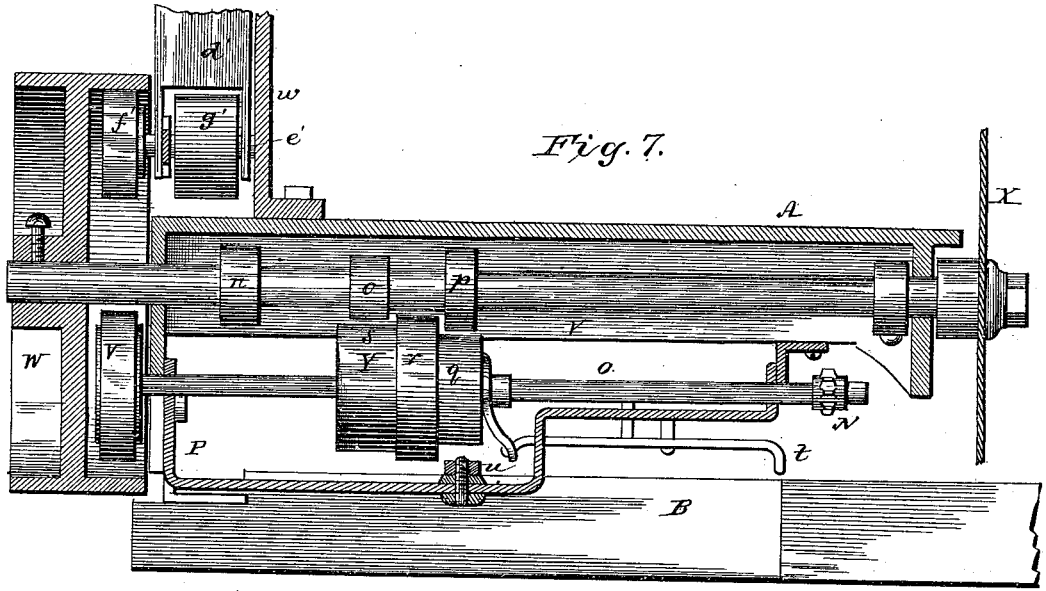
Figure 8:
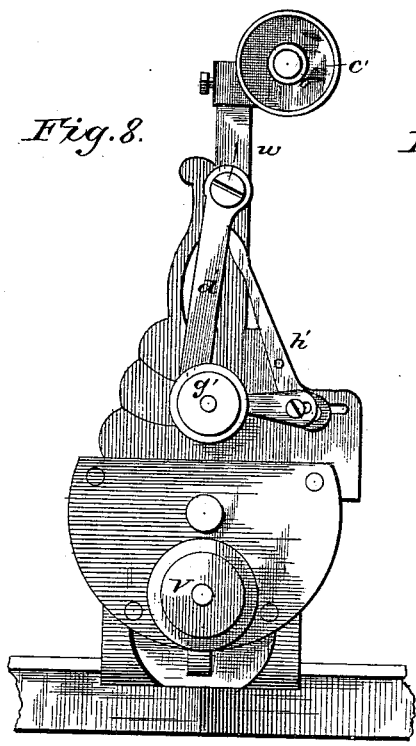
Figure 9:
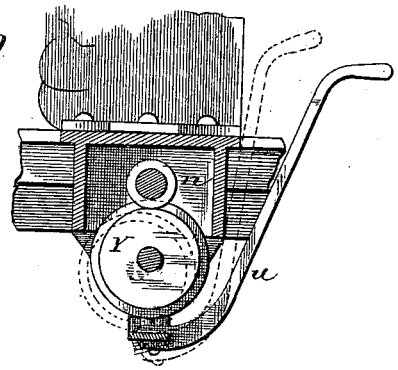
Figure 10:
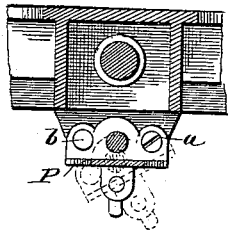
Figure 11:
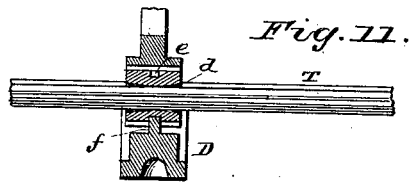

The frame A is secured to the track or way B, the inner timber of which is provided with a T-rail of iron, marked C. Said track or way may be constructed in a series of sections secured together by any means known to the art, and may be of any length desired. The head-blocks D in outline are T-shaped, and are concaved on their inner side for the purpose of economy of material and lightness, and are provided with two friction-rollers, E, having double flanges, which straddle the head or tread of the iron T-rail C, as shown in Fig. 6. The head-blocks D are also provided at their outer end with a friction-roller, F, having plain tread which travels on a flat iron rail, G, secured on the outer timber of the track or way B. To the ends of the inner limbs of the head-blocks D are secured yokes H, which straddle the head or tread of T-rail C, and are employed for the purpose of preventing the displacement of the head blocks D. To the under side of the head-blocks D is attached a feed-rack, I, into the teeth of which mesh the teeth of a pinion, J, mounted on the shaft K, on the inner end of which is a sprocket-wheel, L, which is operated through the medium of the endless chain M, which passes over a sprocket-wheel, N, on the shaft O, journaled in a pivoted frame, P, (shown in Figs. 3 and 7,) which pivoted frame P is provided with double pivot-points marked *a b*. (Shown in Fig. 10.) This arrangement of the double pivot-points *a b* for the pivoted frame P adapts it for either a right or left handed mill. To the forward head-block is attached a graduating-arch, Q, provided with a large number of openings for the reception of a stop-pin for regulating the stroke of the lever R and throw of the pawls *c*. To the graduating-arch Q is pivoted one or more stop-pawls, C', for holding the wheel S in a fixed position after each movement of it by the lever R and pawls *c*. The wheel S is mounted on the set shaft or rod T, which is provided with a longitudinal groove, into which is fitted a tongue in the bore of the wheel S. The set-rod T may be of any desired length for adapting the mill to the sawing of lumber of different lengths. On the set-shaft rod T are pinions *d*, the bore of which gradually increase in diameter from the center toward each end, for the purpose of allowing said pinions to vibrate on the set shaft or rod T.

Figure 12:
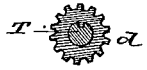

The bore of each of these pinions $d$ has an inwardly-projecting tongue, which fits in a longitudinal groove in the set rod or shaft T, as shown in Fig. 12. In the periphery of the pinions $d$ is a groove, $e$, into which is fitted a tongue, $f$, formed in the outer ends of the head-blocks D, for the purpose of keeping said pinions in proper position with relation to and in mesh with the gear-teeth $c$ on the under side of the knees U, to which are pivoted the ordinary dogs $h$. The knees U have side projecting flanges, $i$, and detachable guides $j$, which catch under flanges $k$, for the purpose of preventing the forward end of the knees U from vertical lift. On the outer end of the head-blocks D are detachable guides $l$, which catch over the upper side of the projecting flanges $i$ of the knees U, for holding the outer end of said knees down on the head-blocks D.

By the hereinbefore-described construction and arrangement of the set mechanism the skillful sawyer can cut lumber of any desired gage. By the peculiar arrangement of the knees and their guides herein described they are not liable to become clogged with ice in wet and freezing weather.

The great advantage in operating a saw-mill (when it is not under shelter) with a free-acting set mechanism and without liability of becoming clogged with snow and ice will be apparent to those having experience in operating portable saw-mills.

To the set-lever R is pivoted a secondary set-lever, $m$, by means of which the sawyer can operate the set mechanism without the necessity of passing over or around to the opposite side of the mill. On the main saw-shaft V is mounted the main driving-pulley W, pulleys $n \ o \ p$, and saw X. On the shaft O is mounted a differential pulley, Y, having three frictional surfaces, marked $q \ r \ s$, for giving different rates of speed to sprocket-wheel L, endless chain M, sprocket-wheel N, shaft K, and pinion J, which meshes into the feed-rack I, thereby producing different rates of speed for feeding the timber to the saw X. The differential pulley is moved longitudinally on the shaft O through the medium of the shifting-lever $t$. To the pivoted frame P is attached a lever, $u$, by means of which said frame can be elevated, bringing the different frictional surfaces of the differential pulley Y against the pulleys $n \ o \ p$, as may be desired by the sawyer. The pivoted frame P is moved into the position shown in Fig. 9 in dotted lines by lifting the lever $u$, thereby bringing the periphery of the pulley $v$ down on the inner surface of the rim of the main driving-pulley W, (see Figs. 7 and 8,) thereby obtaining a reverse motion of the feed mechanism. The pivoted frame P is elevated by pressing down on the lever $u$, thereby bringing the differential pulley against the pulleys $n \ o \ p$, for the purpose hereinbefore stated.

When it is desired to construct a double saw-mill, two uprights are secured to the frame A, on which uprights $w \ x$ are arranged adjustable journals $y$, constructed in one piece, for carrying the shaft $a'$ of the saw $b'$, which shaft is provided with a driving-pulley, $c'$. To the upright $w$ is pivoted a hanger, $d'$, in the end of which is journaled a shaft, $e'$, upon which are mounted pulleys $f' \ g'$. Over pulleys $g'$ and $c'$ is placed a belt for transmitting motion from the pulley $g'$ to the pulley $c'$, shaft $a'$, and saw $b'$. To the hanger $d'$ is attached an adjustable lever, marked $h'$, for moving the hanger, so as to bring the periphery of the pulley $f'$ against the inner surface of the rim of the main driving-pulley W, thereby revolving it, which motion is transmitted to the saw $b'$.

The form and peculiar construction of the frame A affords a perfect protection for the feed mechanism, gives ample room for the truck used for carrying off the sawed lumber, and at the same time combines strength and lightness in said frame, and enables the manufacturer to construct a light, durable, and efficient saw-mill, with all its parts easily reached for the purpose of lubrication or repair, which, in connection with the advantages hereinbefore mentioned, will supply what is desirable in a portable saw-mill.

The construction of the head-blocks forms subject-matter of claims in my application No. 115,899, filed December 29, 1883, of which this is a division, and the means for transmitting motion to the upper saw are claimed in an application filed herewith, Serial No. 168,937.

Having thus described my improvement, what I claim as of my invention is—

1. In a saw-mill, the combination of a hollow T-shaped frame, A, the main saw-shaft V, a supplemental shaft, as O, and an endless chain, said shafts supported and the chain and shafts inclosed and protected by the hollow frame in the manner and for the purpose set forth.

2. In a saw-mill, the combination of a main frame, as A, a swinging frame, as P, attached thereto, a main shaft, as V, supported by the main frame and carrying a saw and a driving-pulley, as W, and a supplemental shaft, as O, carrying a friction-pulley, as $v$, adapted to engage with the inner surface of the driving-pulley, substantially as described.

3. In a saw-mill, the hollow T-shaped frame A, in combination with the main saw-shaft V, differential speed-pulley Y, mounted on shaft O, pulleys $n \ o \ p$ on shaft V, sprocket-wheels L N on shafts K and O, endless chain M, and shipping mechanism connected to pulley Y, substantially as described.

4. The combination, with a saw-mill, of the main driving-shaft having bearings in the fixed frame, the shaft O, arranged parallel with the main shaft, and having its bearings in a frame pivoted to the main frame, and carrying a differential friction-pulley constructed to mesh with the pulleys on the main shaft, and mechanism for engaging said pulleys, substantially as described.

5. The combination, with a saw-mill, of the main driving-shaft having bearings in the fixed frame, the shaft O, arranged parallel with main shaft and having its bearings in a frame provided with two distinct pivot-points, whereby the frame can be connected to engage with the driving-shaft on either side, substantially as described.

6. The combination, with a saw-mill and its main shaft, the shaft O, mounted in a swinging frame connected to the main frame and having two distinct pivot-points, of the main shaft V, provided with friction-pulleys $n$ $o$ $p$, differential pulley Y on shaft O, and lever $u$, attached to the swinging frame for engaging and disengaging the differential driving-pulleys, substantially as described.

7. In combination with a saw-mill and its main shaft, the swinging frame secured to the main frame, shaft O, supported by said swinging frame and bearing pulleys Y and $v$, shaft V, supported by the main frame and provided with driving-pulley W and friction-pulleys $n$ $o$ $p$, shipping-lever $t$, connected to pulley Y, and lever $u$, secured to the swinging frame, substantially as described.

In testimony whereof I affix my signature in presence of two witnesses.

HUGH WRIGHT.

Witnesses:
JAMES J. JOHNSTON,
E. JOHNSTON.